E. WILLIAMS.
RIGID AUTOMOBILE STEERING AXLE.
APPLICATION FILED OCT. 15, 1917.
1,280,346.
Patented Oct. 1, 1918.
2 SHEETS—SHEET 1.
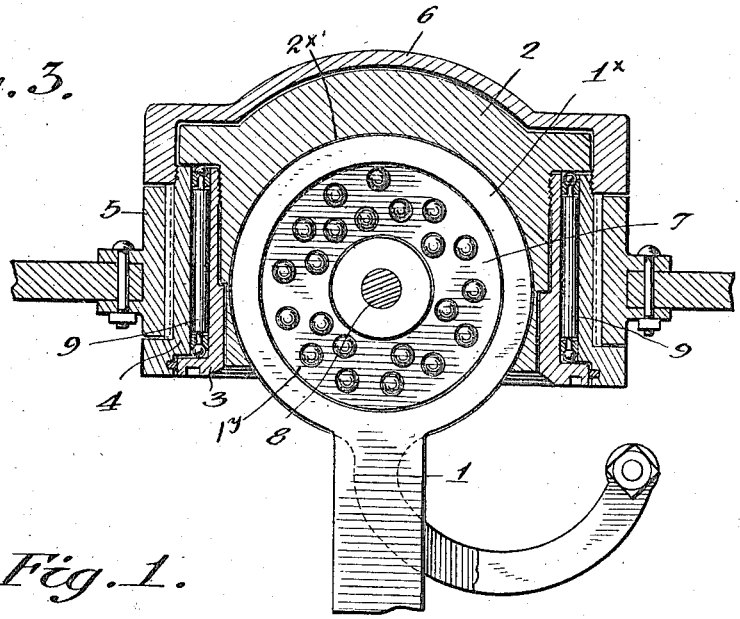
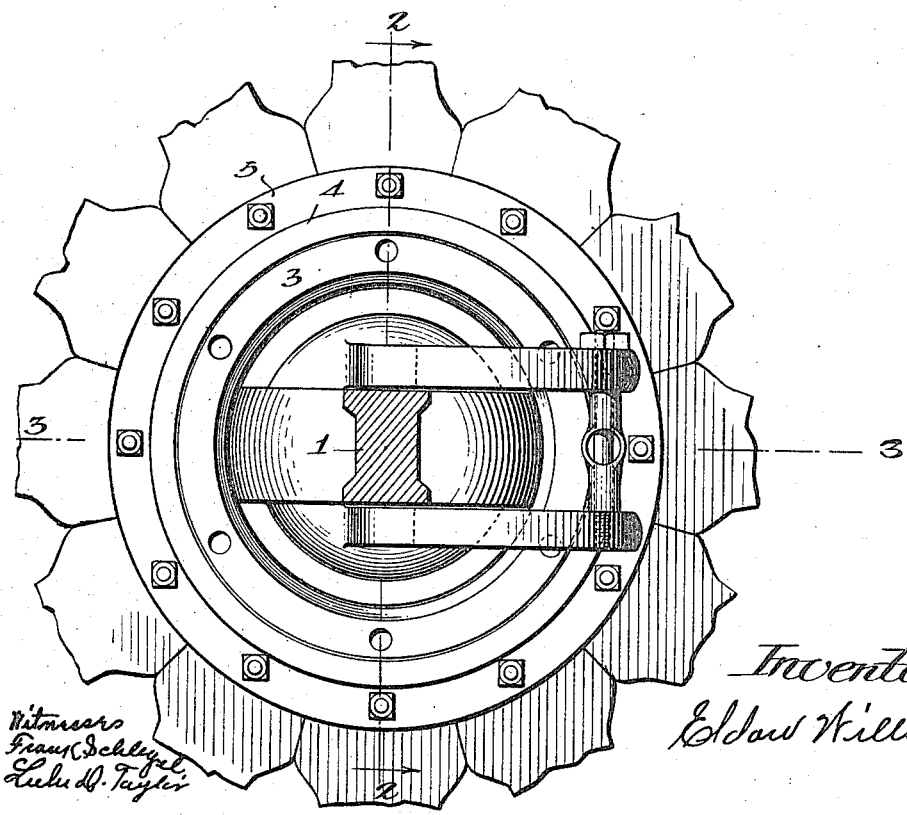

E. WILLIAMS.
RIGID AUTOMOBILE STEERING AXLE.
APPLICATION FILED OCT. 15, 1917.

1,280,346.

Patented Oct. 1, 1918.
2 SHEETS—SHEET 2.

Witnesses
Frank Schlegel
Lulu B. Taylor

Inventor:
Eldon Williams

UNITED STATES PATENT OFFICE.

ELDON WILLIAMS, OF PORTLAND, OREGON.

RIGID AUTOMOBILE STEERING-AXLE.

1,280,346.  Specification of Letters Patent.  Patented Oct. 1, 1918.

Application filed October 15, 1917. Serial No. 196,626.

*To all whom it may concern:*

Be it known that I, ELDON WILLIAMS, a citizen of the United States, and a resident of Portland, in the county of Multnomah and State of Oregon, have made certain new and useful Improvements in Rigid Automobile Steering-Axles, of which the following is a specification.

My invention relates to improvements in axles and more especially in those axles used in automobiles and similar motor vehicles, which permits the turning of the wheels on vertical axes in response to the movements of the steering mechanism.

An object of my invention is to provide an axle which has relatively great strength, and which obviates the tendency of the wheels to wabble when an obstruction is encountered.

A further object of my invention is to provide a simple construction which may be readily assembled or taken apart, and which is not liable to easily get out of order.

My invention is illustrated in the accompanying drawings, forming part of this application, in which,—

Figure 1 is a vertical section through the axle, a portion of the wheel being shown in elevation;

Fig. 3 is a section along the line 3—3 of Fig. 1; and

Figure 2:
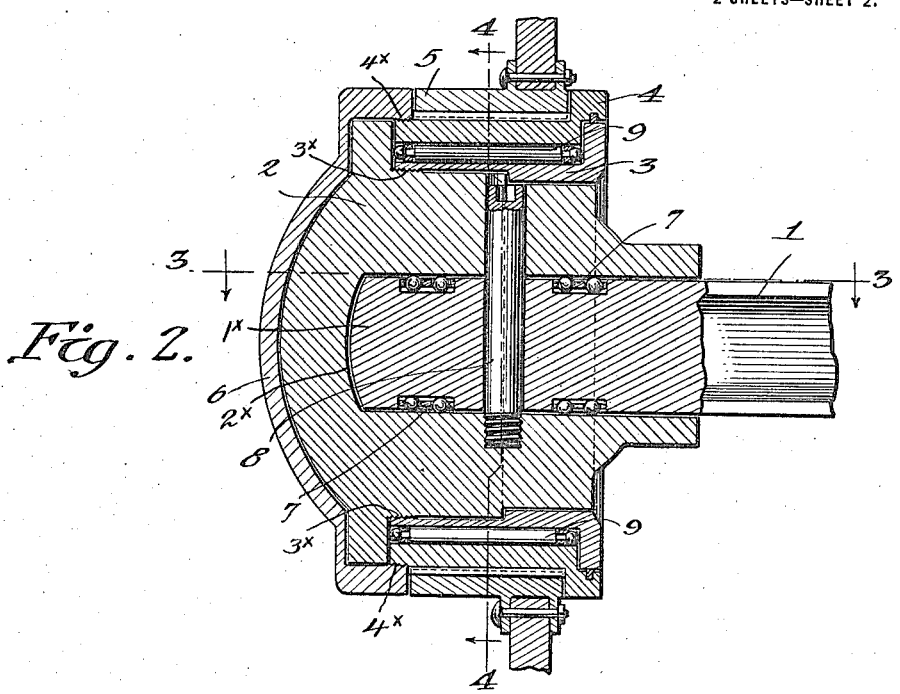
Fig. 2 is a section along the line 2—2 of Fig. 1.

In carrying out my invention I make use of an axle 1, the end of which is made in the form of a circular head $1^x$. The upper and lower faces of the head are provided with ball races $1^y$ for the ball bearings, retaining plates 7 being provided for holding the balls in position, as shown in the drawings.

At 2 I have shown a hub or bearing which is recessed at $2^x$ to receive the circular head $1^x$. The hub 2 has a cylindrical portion over which is fitted an inner roller bearing cone 3, this cone being threaded to engage a threaded portion of the hub 2 as shown at $3^x$. An outer cone 4 is provided, the rollers 9 being held between the inner and outer cones as shown in the drawings.

The outer cone 4 is threaded at $4^x$ and is arranged to be engaged by a threaded hub cap 6 which fits over the end of the hub.

Figure 4:
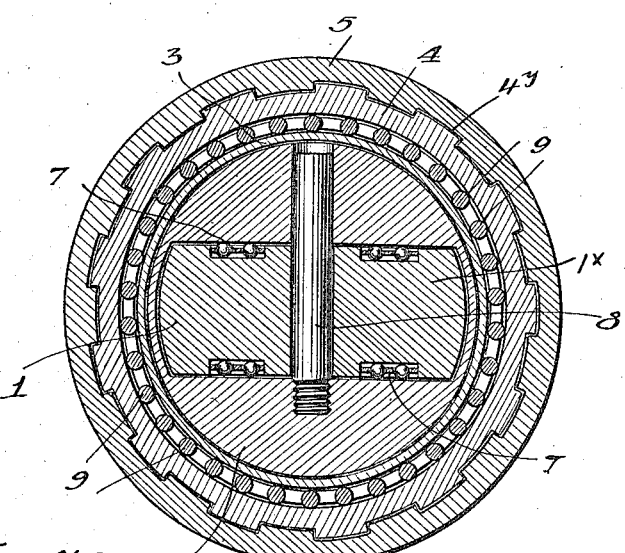
Fig. 4 is a section along the line 4—4 of Fig. 2.

The wheel hub 5 is adapted to fit over the outer cone 4 and, as shown in Fig. 4, the cone has tongues $4^y$ arranged to enter grooves in the hub 5 so as to lock the two portions together as far as rotary movement is concerned.

The head $1^x$ is provided with an opening and a pivot screw or bolt 8 is arranged to extend through the opening, being securely fastened in the body portion of the hub 2 as shown.

From the foregoing description of the various parts of the device, the operation thereof may be readily understood. The construction described permits the rotation of the plane of the wheel around the bolt 8 as a center so as to give the wheel a turning radius of 45° in each direction. The provision of the roller bearings insures the smooth running of the wheel while at the same time the bearings are held rigidly in position but are easily accessible for replacement or repair.

It will be understood that all the threads for the right hand front wheel of the vehicle are right-handed, while for the left front wheel are left-handed. This is for the purpose of giving all the threads a forward movement as in the direction of the turning of the wheel, thereby obviating a tendency to work loose while the wheel is turning.

I claim:

1. The combination of a main axle having a circular head provided with flat upper and lower faces, and having circular ball races in said faces, a hub having a recess arranged to receive said circular head, the upper and lower walls of said recess being flat and arranged to engage the balls in said races, said hub being provided with a threaded cylindrical portion, an inner roller cone having a threaded portion arranged to engage the threaded portion of the hub, an outer cone having a threaded portion, a hub cap having a threaded portion arranged to engage the outer cone, a wheel hub having grooves arranged to receive portions of said outer cone, and a central pivot bolt secured in the body of the hub and arranged to pass through the circular head.

2. The combination of a main axle having a circular head provided with flat upper and lower faces, and having circular ball races in said faces, a hub having a recess arranged to receive said circular head, the upper and lower walls of said recess being flat and arranged to engage the balls in said races, said hub being provided with a threaded cylindrical portion, a central pivot bolt secured in the body of the hub and arranged to pass through the circular head, an inner roller cone having a threaded portion arranged to engage the threaded portion of the hub, said inner cone being borne by that portion of the hub containing the pivot bolt, an outer cone having a threaded portion, a hub cap having a threaded portion arranged to engage the outer cone, rollers disposed between said inner and outer cones, said outer cone being provided with a plurality of tongues, and a wheel hub having grooves arranged to receive said tongues.

3. The combination of a main axle having a circular head, a hub having a recess arranged to receive said head, a pivot bolt carried by the hub and arranged to extend through the head, an inner cone carried by the hub and surrounding the pivot bolt, an outer cone, rollers disposed between said cones, a cap secured to said outer cone, and a wheel hub disposed on said outer cone, and being provided with means for preventing rotation of the wheel hub with respect to the outer cone, said wheel hub being retained in position on the outer cone by said cap.

ELDON WILLIAMS.

Copies of this patent may be obtained for five cents each, by addressing the "Commissioner of Patents, Washington, D. C."